(12) United States Patent
Goto et al.

(10) Patent No.: US 7,656,826 B2
(45) Date of Patent: Feb. 2, 2010

(54) TERMINAL CONTROL SYSTEM

(75) Inventors: Koji Goto, Kariya (JP); Hideya Kurachi, Toyota (JP); Nobuyasu Kimura, Haguri-gun (JP); Chiaki Sumi, Chita-gun (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 408 days.

(21) Appl. No.: 11/632,187

(22) PCT Filed: Jul. 25, 2005

(86) PCT No.: PCT/JP2005/013550

§ 371 (c)(1),
(2), (4) Date: Jan. 17, 2007

(87) PCT Pub. No.: WO2006/011433

PCT Pub. Date: Feb. 2, 2006

(65) Prior Publication Data

US 2008/0089253 A1  Apr. 17, 2008

(30) Foreign Application Priority Data

Jul. 28, 2004  (JP) .............................. 2004-220892

(51) Int. Cl.
*H04L 5/14* (2006.01)
*H04L 12/413* (2006.01)

(52) U.S. Cl. ....................................... 370/276; 370/447

(58) Field of Classification Search .................. 370/276, 370/447

See application file for complete search history.

(56) References Cited

U.S. PATENT DOCUMENTS 4,713,840 A * 12/1987 Hasegawa .................... 725/114

(Continued)

FOREIGN PATENT DOCUMENTS

JP  61-006947 A  1/1986

(Continued)

OTHER PUBLICATIONS

Official Action issued in corresponding JP 2004-220892, May 1, 2008, JPO, Japan; and English-language translation thereof.

(Continued)

*Primary Examiner*—Andrew Lee
(74) *Attorney, Agent, or Firm*—Buchanan Ingersoll & Rooney PC (57) ABSTRACT

A terminal control system is provided that has a main control device, a plurality of terminal devices controlled by the main control device, and communication lines for connecting the main control device and each of the terminal devices so as to allow bidirectional communication, wherein the configuration is simple, communication time is short, and highly reliable bidirectional communication is possible. The terminal control system comprises a main control device 1, a plurality of terminal devices 2 controlled by the main control device 1, and communication lines 3 for connecting the main control device and each of the terminal devices so as to allow bidirectional communication, wherein control data is simultaneously and collectively sent from the main control device 1 to a plurality of the terminal devices 2, and terminal data for each of the terminal devices is independently sent from each of the terminal devices 2 to the main control device 1.

8 Claims, 3 Drawing Sheets

U.S. PATENT DOCUMENTS

| | | | |
|---|---|---|---|
| 4,745,600 A | | 5/1988 | Herman et al. |
| 5,388,091 A | * | 2/1995 | Kagawa ................... 370/250 |
| 6,359,712 B1 | * | 3/2002 | Kamitani ................... 398/41 |
| 2001/0010694 A1 | * | 8/2001 | Lindsey et al. ............. 370/405 |
| 2003/0035391 A1 | * | 2/2003 | Shobatake ................. 370/331 |
| 2006/0256744 A1 | * | 11/2006 | Kim et al. ................. 370/284 |

FOREIGN PATENT DOCUMENTS

| | | |
|---|---|---|
| JP | 62-064145 A | 3/1987 |
| JP | 63-299627 A | 12/1988 |
| JP | 3-254552 A | 11/1991 |
| JP | 04-273738 A | 9/1992 |
| JP | 08-083389 A | 3/1996 |
| JP | 11-243405 A | 7/1999 |
| JP | 2002-152213 A | 5/2002 |

OTHER PUBLICATIONS

International Search Report issued in corresponding PCT/JP2005/013550, Sep. 13, 2005, JPO, Japan (in English).

* cited by examiner

TERMINAL CONTROL SYSTEM

TECHNICAL FIELD

The present invention relates to a terminal control system that has a main control device, a plurality of terminal devices controlled by the main control device, and communication lines for connecting the main control device and the terminal devices so as to allow bidirectional communication.

BACKGROUND ART

There are sensor control systems that are used as terminal controls systems in which a communication line is connected between a microcomputer (corresponding to a main control device) and a plurality of sensors (corresponding to terminal devices), the microcomputer sends control data to the sensors by way of the communication lines, and the sensors send detected data to the microcomputer. Often, in recent times, information that is proximate to human senses is acquired using such a system, and various equipment is controlled to anticipate human needs. A large quantity of information must be handled in real-time (simultaneously) in order to achieve better control without causing human discomfort. Therefore, a large number of sensor control systems is used in a single piece of equipment. For this reason, large communication lines in such a system are not advantageous from the aspect of cost, and the microcomputer and sensors in the system are connected by simple communication means. In serial communication, for example, a small system can be built because the data is transferred serially one bit at a time, as indicated by the name.

Full-duplex and half-duplex systems are used as methods of carrying out bidirectional serial communication between a microcomputer and a sensor. The full-duplex system can constantly perform bidirectional communication, and a single communication line is required for each direction. If, for example, a single microcomputer independently controls four sensors, eight communication lines would be required.

The half-duplex system cannot simultaneously perform bidirectional communication, but the communication line can be shared. When all of the devices are connected by a shared communication line, a system can be built with few communication lines. However, since shared communication lines are used, data collisions (data conflicts) occur in cases in which transmission from a plurality of sensors occurs simultaneously. Patent Document 1 describes a technique for solving the conflict problem when half-duplex communication is used among a plurality of devices.

The system described in Patent Document 1 relates to a non-synchronous serial communication method that comprises at least one or more masters (corresponding to the main control device and microcomputer described above), and at least one or more slaves (corresponding to the terminal devices and sensors described above), and in which signal lines that function as data transmission lines are connectively formed.

In a configuration such as that shown in FIG. 1 of Patent Document 1, transmitted data experiences a conflict when simultaneously transmitted from a plurality of devices. In view of this situation, transmitting devices compare and verify their own transmission data and the received data received by way of the bidirectional communication line (data bus). When a transmitting device has determined that the own transmission data of the device is not in conflict on the data bus, or that the own data of the device has priority when there is a conflict, the transmitting device determines that transmission is successful and will continue communication thereafter. When the transmission device has determined that there is conflict, that the own data of the device does not have priority, and that the data bus cannot be accessed, the transmitting device will determine that transmission has failed and will thereafter withhold communication. Communication data conflicts are prevented and bus arbitration is carried out in this manner.

Patent Document 1: Publication of Japanese Patent Application No. 11-243405 (FIG. 1, Paragraphs 11 to 23)

DISCLOSURE OF THE INVENTION

Problems that the Invention is Intended to Solve

The invention described in Patent Document 1 has the definite effect of eliminating conflicts on a bus that performs bidirectional communication. However, in order to prevent conflicts when there are simultaneous communication requests, one transmitting device is given priority, and the other withholds communication. For this reason, when a single microcomputer controls four sensors, for example, as described in an earlier example, the required communication time is quadrupled in comparison with full-duplex communication. This means that more communication time will be required as the number of sensors (terminal devices) associated with the microcomputer (main control device) increases, and such a situation is not desirable.

The present invention was contrived in view of such problems, and an object thereof is to provide a terminal control system that has a main control device, a plurality of terminal devices controlled by the main control device, and communication lines for connecting the main control device and each of the terminal devices so as to allow bidirectional communication, wherein the configuration is simple, communication time is short, and highly reliable bidirectional communication is possible.

Means for Solving the Problems

The characteristic configuration of the terminal control system according to the present invention for achieving the above-described objects comprises a main control device, a plurality of terminal devices controlled by the main control device, and communication lines for connecting the main control device and each of the terminal devices so as to allow bidirectional communication, wherein control data is simultaneously and collectively sent from the main control device to the terminal devices, and terminal data for each of the terminal devices is independently sent from each of the terminal devices to the main control device.

In accordance with the characteristic configuration, control data is simultaneously and collectively sent from the main control device to a plurality of the terminal devices. Therefore, the communication time is not increased in proportion to the number of terminal devices. In such a terminal control system, commands having the same content are often given to a plurality of terminal devices. When, for example, the terminal devices are sensors, the commands are reset commands, commands to transmit detection results, or the like. The communication time can therefore be shortened and real-time (concurrent) data acquisition can be assured by simultaneously and collectively sending control data as described in the present characteristic configuration. Conversely, terminal data that is to be sent from the terminal devices to the main control device varies among the terminal devices. Therefore, when data is independently sent to the terminal devices as described in the present characteristic configuration, communication waiting time does not occur and the communication time does not increase in proportion to the number of terminal devices. Also, since terminal data conflicts do not occur, highly reliable bidirectional communication can be achieved.

In the terminal control system according to the present invention, the main control device has downstream transmission means for sending the control data to the terminal devices, and a plurality of upstream receiving means for independently receiving the terminal data from the terminal devices; the terminal devices have upstream transmission means for sending the terminal data from the terminal devices to the main control device, and downstream receiving means for receiving the control data from the main control device; and the communication lines have downstream communication lines for sending shared control data from the downstream transmission means to the downstream receiving means, and upstream communication lines for sending individual terminal data from the upstream transmission means to the corresponding upstream receiving means.

In accordance with the configuration, the downstream communication line connects the downstream transmission means of the main control device and the downstream receiving means of the terminal devices. Therefore, control data from the main control device can be simultaneously and collectively transmitted to the terminal devices. In this case, the configuration may be one in which one of the ends of the downstream communication line has a single terminal connected to the main control device, and the other end has a plurality of terminals connected to the terminal devices.

Also, since the upstream communication line connects the upstream transmission means of the terminal devices and the upstream receiving means of the main control device, terminal data can be independently sent to each of the terminal devices.

The terminal control system according to the present invention may be configured so that the control data has identification information for specifying each of the terminal devices; the terminal devices have determination means for identifying whether identification information specifies any of the terminal devices; and the main control device is configured to be capable of individually controlling the terminal devices.

In accordance with this characteristic, the control data has identification information for specifying each of the terminal devices, and the terminal devices have determination means for identifying whether the identification information specifies any of the terminal devices. Therefore, when control data is received that is simultaneously and collectively sent from the main control device, a terminal device determines whether the control data is related to the terminal and the control data is ignored when the data is not related. Examples of control data include a data resend command and an individual reset command, and these commands are carried out for confirmation when the terminal data received by the main control device is markedly different than the expected value.

As described above, transmissions from the terminal devices to the main control device are independently carried out for each of the terminal devices, so even if an unnecessary response is transmitted from non-targeted terminal devices to the main control device, there is essentially no problem as long as the main control device ignores such transmissions. However, non-targeted terminal devices must make an unnecessary response, and the main control device must carry out a routine to determine unnecessary responses. Such a situation is a waste of processing resources for both devices, and is not preferred from the aspect of power consumption. In particular, if the system is driven by a battery or the like, lower power consumption is an important aspect. Therefore, such waste does not occur and power consumption can be reduced by configuring a system according to the present characteristic.

The configuration may furthermore be one in which the identification information has a terminal identification number for specifying at least each of the terminal devices, and a flag for indicating whether the terminal identification number is valid or invalid; and the determination means identifies whether the terminal identification number specifies any of the terminal devices when the flag indicates a valid state.

In accordance with this configuration, if the flag is in an invalid state, the terminal devices do not identify the terminal identification number by decoding, for example. Since such unnecessary identification (decoding) does not occur, power consumption and the load on the terminal devices can be reduced. Also, collective commands in which the terminal number is not specified are reset commands, commands to transmit detection results, or the like. Specifically, there are many commands that require immediate execution. The terminal devices can therefore rapidly execute imparted commands without unnecessary identification (decoding) as described above.

In the terminal control system according to the present invention, the main control device has downstream transmission means for sending the control data to the terminal devices, and a plurality of upstream receiving means for independently receiving the terminal data from the terminal devices; the terminal devices have upstream transmission means for sending the terminal data from the terminal devices to the main control device, and downstream receiving means for receiving the control data from the main control device. Specifically, the main control device has interference prevention means for preventing interference of the terminal data sent from the terminal devices to the main control device; the main control device and terminal devices have an arbiter unit for preventing the data sent by the devices from being received by the devices of the transmission source; and the communication lines are bidirectional communication lines for transmitting the control data from the main control device to the terminal devices and for transmitting the terminal data from the terminal devices to the main control device, and are independently provided for each of the terminal devices.

In accordance with this characteristic configuration, the communication lines are bidirectional communication lines for transmitting control data from the main control device to the terminal devices and terminal data from the terminal devices to the main control device, and are independently provided to each of the terminal devices. Therefore, the terminal control system may be configured having only the same number of communication lines as the number of terminal devices. Also, since the communication line is independently provided to each of the terminal devices, terminal data can be sent independently to each of the terminal devices. Furthermore, the single downstream transmission means provided to the main control device simultaneously and collectively sends control data through the communication line independently provided to each of the terminal devices. The communication time for sending control data and sending terminal data therefore does not increase in proportion to the number of terminal devices.

When configured in this manner, the communication lines independently provided to each of the terminal devices can be set in a short-circuited state by way of the downstream transmission means shared by the terminal devices. In a short-circuited state, terminal data independently inputted to the main control device may experience a conflict, i.e., so-called interference. However, in accordance with the characteristic configuration, interference can be prevented because interference prevention means is provided.

The main control device and the terminal devices have transmission means and receiving means, and since these are connected by transceiving communication lines, there is a possibility that the data sent by the transmission means will be received by the receiving means of the same device. However, in accordance with this characteristic configuration, such a problem does not occur because the arbiter unit is provided for preventing the transmission source devices from receiving the data sent by the devices.

The interference prevention means can be configured having diodes that form forward connections from the input end of the upstream receiving means to the output end of the downstream transmission means.

Also, the output end of the downstream transmission means and the output end of the upstream transmission means can assume one of two states, i.e., a state in which each transmission means outputs one of two Boolean values that can be independently output, and another state, which is a high impedance state; and the arbiter unit can be configured to control switching between at least these two states.

An excellent terminal control system can be achieved in a simple configuration by configuring the interference prevention means and the arbiter unit in the manner described above.

The terminal control system according to the present invention has identification information whereby the control data specifies each of the terminal devices, the terminal devices have determination means for identifying whether the identification information specifies any of the terminal devices, and the main control device can be configured to be capable of individually controlling the terminal devices.

In accordance with this characteristic, when control data is received that is simultaneously and collectively sent from the main control device, a terminal device determines whether the control data is related to the device, and the control data is ignored when the data is not related. As described above, transmissions from the terminal devices to the main control device are performed independently for each of the terminal devices. Therefore, even if an unnecessary response is transmitted from non-targeted terminal devices to the main control device, there is essentially no problem as long as the main control device ignores such transmissions. However, non-targeted terminal devices must make an unnecessary response, and the main control device must carry out a routine to determine unnecessary responses. Such a situation is a waste of power and processing resources for both devices. In particular, if the system is driven by a battery or the like, lower power consumption is an important aspect, and power consumption can be reduced by configuring the system according to the present characteristic.

The configuration may furthermore be one in which the identification information has a terminal identification number for specifying at least each of the terminal devices, and a flag for indicating whether the terminal identification number is valid or invalid; and the determination means identifies whether the terminal identification number specifies any of the terminal devices when the flag indicates a valid state.

In accordance with this configuration, if the flag is in an invalid state, the terminal devices do not identify the terminal identification number by decoding, for example. Since such unnecessary identification (decoding) does not occur, power consumption and the load on the terminal devices can be reduced. Also, collective commands in which the terminal number is not specified are reset commands, commands to transmit detection results, or the like. Specifically, there are many commands that require immediate execution. The terminal devices can therefore rapidly execute imparted commands without unnecessary identification (decoding) as described above.

BEST MODE FOR CARRYING OUT THE INVENTION

Examples of the present invention are described below with reference to the diagrams.

(System Overview)

Figure 1:
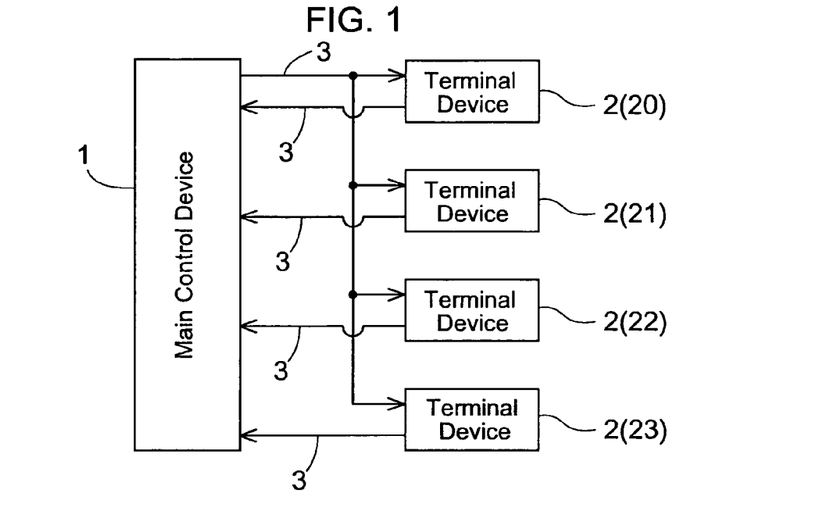
FIG. 1 is a block diagram showing a connection example of the terminal control system according to an embodiment of the present invention.

FIG. 1 is a block view showing a connection example of the terminal control system according to an embodiment of the present invention. The terminal control system according to the present embodiment has a main control device 1, a plurality of terminal devices 2 (20 to 23) controlled by the main control device 1, and communication lines 3 for connecting the main control device 1 and the terminal devices 2 so as to allow bidirectional communication, as shown in FIG. 1. The terminal devices 2 are sensors and microcomputers for controlling an actuator, and the main control device 1 comprises a microcomputer and logic circuits, for example. In the terminal control system, control data is simultaneously and collectively sent from the main control device 1 to the terminal devices 20 to 23, and terminal data is independently sent to each of the terminal devices from the terminal devices 2 to the main control device 1. The main control device 1 and terminal devices 2 have independent internal system clocks that have an integral multiple ratio, and the devices use asynchronous communication.

Figure 2:
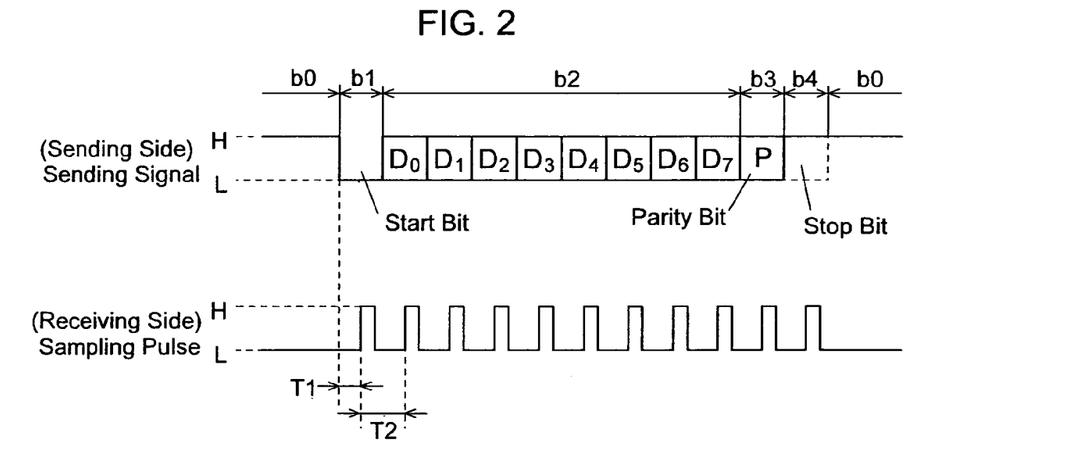
FIG. 2 is a waveform chart of an example of a communication mode of the terminal control system according to an embodiment of the present invention.

FIG. 2 is a waveform chart showing an example of a communication mode of the terminal control system. In the present embodiment, the main control device 1 and terminal devices 2 are connected so as to allow bidirectional communication. Therefore, the devices both function are transmitting and receiving devices. In other words, when one of the devices is a transmitting device, the other device is a receiving device; and when one device is a receiving device, the other device is a transmitting device.

Serial communication data sent from the transmitting device via the communication lines 3 is in an H (high) state when in an idling state (non-communicating state) b0 because the communication lines 3 are pulled up (see FIG. 4) by the power source by way of a resistor, as shown in FIG. 2. The transmitting device initially sends communication data in an L (low) state as a start bit b1 when communication is started. Data bits b2 are sent subsequent to the start bit b1. In the present embodiment, the data bits b2 are 8-bit data and are sent in combinations of H/L states in accordance with the content. When the data bits b2 have been sent, a parity bit b3 corresponding to the transmission data is set. Even parity and odd parity are available as parity, which is error-correcting code, and the parity is determined in advance as a technical specification of the terminal control system. H-state communication data is lastly sent as a stop bit b4 and the transmitting device is again set in an H-state, which is the idling state b0.

On the other hand, the receiving device detects that the communication data received via the communication lines 3 has changed from the H state of the idling state to an L state, and acknowledges that the start bit b1 has been sent from the transmitting device. In relation to detecting the state in which the start bit b1 becomes an L state, edge detection is used as the method of detecting the trailing edge of the communication signal. A sampling pulse is generated when a prescribed length of time T1 has elapsed after this detection procedure. Thereafter, sampling pulses are generated at each data pitch T2 that corresponds to the communication speed. The number of bits received in a single communication is established as a specification of the terminal control system. Therefore, the number of generated sampling pulses corresponds to the number of bits. In the present embodiment, a total of 11 pulses are generated because communication data comprises the 8 data bits b2 as well as the start bit b1, parity bit b3, and stop bit b4, each comprising a single bit. The leading edges, for example, of the sampling pulses are the strobe points for receiving communication data. In the present embodiment, the prescribed time T1 is ½ of the data pitch T2, and the stable timing in the vicinity of the central part of each bit is used as the strobe point, which is the data acquisition point. For example, when the data pitch T2 is set to be 10 ms (milliseconds), the total communication time is 110 ms and a sampling pulse is generated every 10 ms during that interval.

In the terminal control system in the present embodiment, the terminal data is transmitted from the terminal devices 2 so as to respond to the instructions (transmission of the control data) from the main controller 1. Therefore, if the main control device 1 sends the next command (control data) having provided a sufficient time interval that allows the terminal devices 2 to respond to the instruction and output the terminal data, the transmission data can be prevented from mutually conflicting on the communication lines 3.

The control data is simultaneously and collectively sent from main control device 1 to the terminal devices 20 to 23, as described above. Therefore, the communication time does not increase in proportion to the number of terminal devices 2. In the terminal control system, commands having the same content are given to two or more terminal devices. For instance, when the terminal device 2 is a sensor, the detection result is a send command, a reset command, or the like. Therefore, the communication time can be shortened by simultaneously and collectively sending the control data. Conversely, the communication time never increases in proportion to the number of terminal devices when each of the terminal devices transmits independently because the terminal data sent from the terminal devices 20 to 23 to the main control device 1 varies depending on each of the terminal devices 20 to 23.

Commands that do not target all the terminal devices 2 may be included in the control data from main control device 1. Examples of such commands include a retransmission command of the terminal data and an individual reset command. These commands are issued for confirmation purposes when the terminal data received by the main control device 1 is considerably different from the expected value.

The control data is received by all the terminal devices 20 to 23 together, even when the terminal data retransmission command is destined for terminal device 23 of FIG. 1, for example. The data is transmitted from the terminal devices 20 to 23 to the main control device 1 independently for each of the terminal devices. Here, the main control device 1 ascertains which terminal device has the necessary terminal data. Therefore essentially no problems are encountered as long as the terminal data transmitted from the non-targeted terminal devices 20 to 22 to the main control device 1 is ignored by the main control device 1 as not requiring a response.

However, non-targeted terminal devices 20 to 22 must make a needless response, and the main control device 1 must perform processing to determine such needless responses. Such a situation is a waste of processing resources for both devices, and is not preferred from the aspect of power consumption. In particular, if the system is driven by a battery or the like, lower power consumption is an important aspect.

The control data has identification information that specifies each of the terminal devices 20 to 23. The terminal devices 20 to 23 comprise determination means (see reference numeral 11 in FIG. 4) for identifying whether the identification data specifies any of the terminal devices, and the main control device 1 can individually control each of the terminal devices 20 to 23. In such a configuration, when the terminal devices 20 to 23 receive control data that is simultaneously and collectively sent from the main control device 1, each of the terminal devices determines whether the control data is related to the device, and the device ignores the control data when the data is unrelated.

Figure 3:
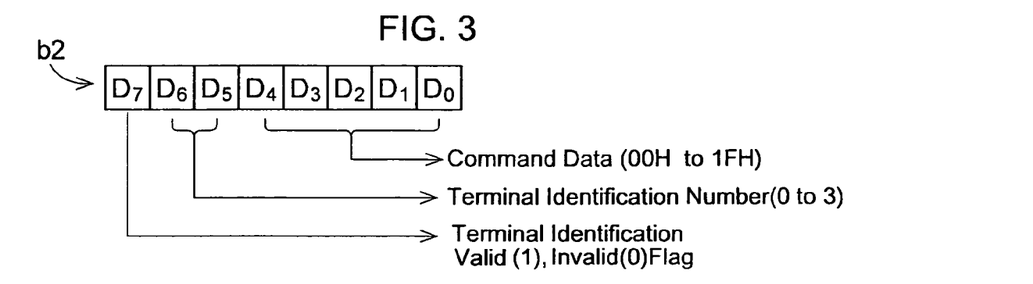
FIG. 3 is a descriptive diagram showing an example of the control data of the terminal control system according to an embodiment of the present invention.

A specific example of the identification information will be described with reference to FIG. 3. FIG. 3 is a descriptive diagram showing an example of the control data, and shows the data bit b2 portion of the transmission signal in the communication mode described with reference to FIG. 2. As described above, the data bits b2 comprise eight bits, and three of the bits are used as identification information. These three bits are composed of a 2-bit terminal identification number and a 1-bit flag. Four terminal devices 2 are provided in the present embodiment, and two bits are therefore used for identification information. The present example uses identification information that includes a flag, but the present invention is not limited thereby. The configuration may naturally be one in which the identification information has only a terminal identification number and does not have a flag.

For example, the terminal identification number may specify a terminal device in the following manner: the terminal device 20 is specified when the data bits b2 shown in FIG. 3 are D6=D5=0 (L state), the terminal device 21 when D6=0 and D5=1 (H state), the terminal device 22 when D6=1 and D5=0, and the terminal device 23 when D6=1 and D5=1. The number of bits can be increased when the number of terminal devices 2 is increased.

In the present example, the flag for determining whether the terminal identification number is valid or invalid is assigned to the single bit D7. When the flag is 0, the control data is a command that is applicable to all the terminal devices 2. Specifically, if the flag is in an invalid state, the terminal devices do not decode the terminal identification number. Since needless decoding is not carried out, the load and power consumption of the terminal devices can be reduced. Collective commands that do not specify a terminal number are often reset commands, commands to transmit detection results, and other commands that require immediate execution. The terminal devices can rapidly execute received commands without needless decoding.

In the present example, commands (command data) to the terminal devices 2 are expressed using five bits, i.e., D4 to D0.

FIRST EMBODIMENT

Figure 4:
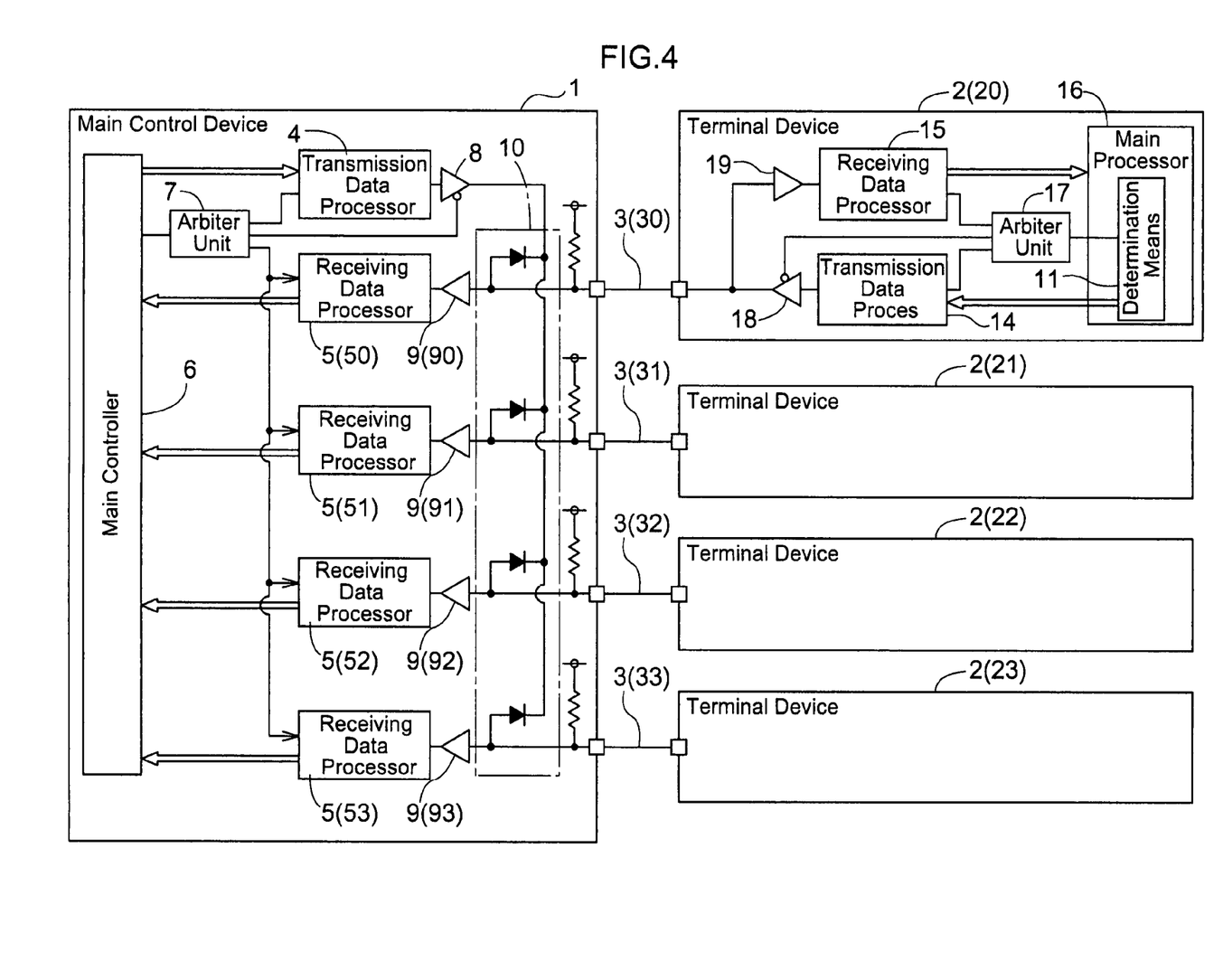
FIG. 4 is a block diagram showing an example of the terminal control system according to an example of the present invention.

FIG. 4 is a block diagram showing an example of the terminal control system according to an embodiment of the present invention. The terminal control system of the present embodiment has a main control device 1, a plurality of terminal devices 2 (20 to 23) controlled by the main control device 1, and communication lines 3 (30 to 33) for connecting the main control device 1 and the terminal devices 2 so as to allow bidirectional communication, as shown in FIG. 4. Herein below, the terminal devices 20 to 23 will be described as terminal devices 2, and the communication lines 30 to 33 will be described as communication line 3 for a case in which there is no particular need to distinguish between the terminal devices.

The main control device 1 has downstream transmitting means 8 for sending control data to the terminal devices 2, and a plurality of upstream receiving means 9 (90 to 93, herein-after represented by the reference numeral 9 when there is no particular need to distinguish between the terminal devices) for independently receiving terminal data from the terminal devices 2. Also, each of the terminal devices 2 has upstream transmitting means 18 for sending terminal data to the main control device 1, and downstream receiving means 19 for receiving control data from the main control device 1. Control data is simultaneously and collectively sent from the main control device 1 to the terminal devices 2 by way of the communication lines 3 independently provided to each to the terminal devices 2. Terminal data is independently sent for each of the terminal devices from the terminal devices 2 to the main control device 1. In other words, a communication line 3 is disposed independently for each of the terminal devices as a bidirectional communication line for sending control data from the main control device 1 to the terminal devices 2, and sending terminal data from the terminal devices 2 to the main control device 1.

Specifically, the downstream transmitting means 8 of the main control device 1 is connected so as to be capable of simultaneously and collectively sending control data to the downstream receiving means 19 of each of the terminal devices 20 to 23, as shown in FIG. 4. The downstream receiving means 19 and upstream transmitting means 18 of each of the terminal devices 20 to 23 are connected to the same terminals of the terminal devices 20 to 23, respectively. The upstream receiving means 90 to 93 of the main control device 1 and the downstream transmitting means 8 of the main control device 1 are connected by way of the output terminal of the downstream transmitting means 8, and the input terminals (output terminal of the downstream transmitting means 8) of the upstream receiving means 90 to 93 are in a state in which a wired-OR relationship is established.

As used herein, the phrase "a wired-OR state" refers to a state in which, when the terminal data sent from the terminal device 23 is all in an L state, for example, all of the terminal data sent from the other terminal devices 20 to 22 assumes an L state, even if the data is in an H state. In the present embodiment, since the communication lines 30 to 33 are pulled up by a resistor, all the communication lines 30 to 33 are in an H state when idle. In this case, when an L-state signal is presented to any of the communication lines, e.g., the communication line 33, an electric potential appears at both ends of the resistor, and the communication line 33 therefore assumes an L state. At this time, the L state is also imparted to the other communication lines 30 to 32 connected to the communication line 33, and an electric potential appears in the same manner at the two ends of the pull-up resistors, resulting in an L state.

This phenomenon results in terminal data interference, and the situation is not desirable for the main control device 1, which receives the terminal data. In view of this situation, the main control device 1 is provided with interference prevention means 10 for resolving the wired-OR state and preventing interference of terminal data sent from the terminal devices 2 to the main control device 1. In the present embodiment, the interference prevention means 10 is implemented by connecting signal diodes in the forward direction from the input terminals of the upstream receiving means 9 to the output terminal of the downstream transmitting means 8. When the signal diodes are connected in such a manner, electric current does not flow to the signal diodes. This is because the input terminals of the upstream receiving means 9 have the opposite electric potential of the polarity of the signal diodes, even if the input terminals are in an L state. Thus, the L state of the input terminals of the upstream receiving means 9 is not propagated to the output terminal of the downstream transmitting means 8. As a result, interference does not occur via the output terminal of the downstream transmitting means 8.

The input terminals of the downstream receiving means 19 of the terminal devices 2 and the output terminals of the upstream transmitting means 18 are connected at the terminals that connect the communication lines 3, as shown in FIG. 4. In a similar manner, the output terminal of the downstream transmitting means 8 of the main control device 1 and the input terminals of the upstream receiving means 9 are connected at the terminals that connect the communication lines 3, albeit by way of the signal diodes. Therefore, the data sent by each of the devices can be received by the transmission source devices by way of the terminal connecting the communication line 3 of each of the devices. In view of this situation, in the present embodiment, arbiter units 7 and 17 that prevent transmission source devices from receiving the data sent by each of the devices are provided to the main control device 1 and terminal devices 2.

Figure 5:
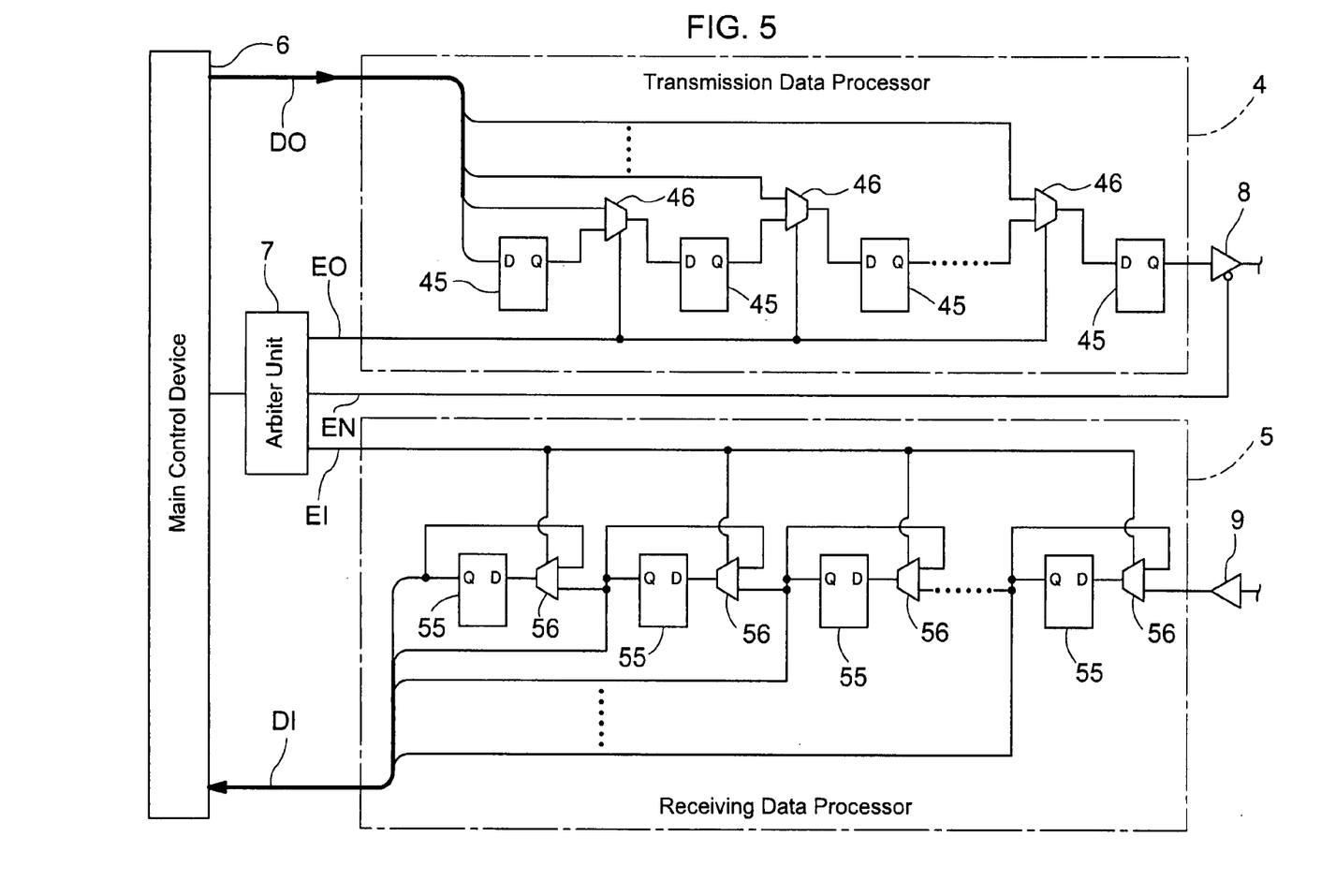
FIG. 5 is a block diagram that describes the function of the arbiter unit of FIG. 4.

The function of the arbiter units 7 and 17 is described below. The arbiter units 7 and 17 mutually the same structure, and the arbiter unit 7 will therefore be described below unless two units need to be distinguished in particular. FIG. 5 is a block diagram describing the function of the arbiter unit 7. The arbiter unit 7 primarily functions to control the transmission data processor 4, the receiving data processor 5, and the downstream transmitting means 8. The arbiter unit 17 of the terminal devices 2 functions to control the transmission data processor 14, the receiving data processor 15, and the downstream transmitting means 18 (see FIG. 4).

Following is a description of the manner in which the transmission data processor 4 is controlled. The transmission data processor 4 receives control data that is configured as parallel data DO from a main controller 6, as shown in FIG. 5. The parallel data is presented 1 bit at a time, and is set in registers 45. The registers 45 are serially connected to form a shift register, and data is output to the downstream transmitting means 8 as serial data one bit at a time. In this case, the registers 45 must select whether to receive control data as parallel or serial data that is to be propagated through the shift register. These two data types are inputted to a multiplexer 46, and one of the two is selected using a selection signal EO that is outputted from the arbiter unit 7. In other words, the arbiter unit 7 controls the operation of loading control data destined for the registers 45, and the shift register operation of the registers 45.

In this manner, the arbiter unit 7 uses an output enable signal EN to control whether the control data, which is serial data outputted to the downstream transmitting means 8, is to be outputted via the downstream transmitting means 8. The downstream transmitting means 8 comprises a tri-state buffer, as shown in FIGS. 4 and 5. When the downstream transmitting means 8 is set in an outputting state, control data is outputted from the output terminal, and when set in a non-outputting state, the output terminal is set in a high-impedance (Hi-Z) state.

The receiving data processor 5 is controlled in the following manner. The receiving data processor 5 receives as serial data terminal data that has been received in the upstream receiving means 9. Registers 55 are serially connected to constitute a shift register, and terminal data is propagated in the order the data is received. When terminal data is propagated to all of the registers 55, the main controller 6 accommodates the data as parallel data DI, and processing is carried out using the terminal data received inside the main controller 6.

In this situation, the control data sent by the main control device 1 is accommodated inside the receiving data processor 5 when the control data outputted by way of the downstream transmitting means 8 is received by the upstream receiving means 9 via the terminal connected to the communication lines 3. The main controller 6 ultimately receives erroneous parallel data DI when the data is propagated through the registers 55, which constitute a shift register. In view of the above, a multiplexer 56 is disposed prior to the input of the registers 55, and the multiplexer selects whether to propagate serial data or to hold its own output data (self-holding). The arbiter unit 7 uses the selection signal EI to control the multiplexer 56.

When the shift register operation as such does not need to be stopped, so-called masking processing can merely be carried out. The logic state of the terminal data received by way of the upstream receiving means 9 can thereby be fixed in an L state or an H state.

SECOND EMBODIMENT

In the first embodiment, communication lines 3 are independently disposed for each terminal device as bidirectional communication lines that send control data from the main control device 1 to the terminal devices 2, and send terminal data from the terminal devices 2 to the main control device 1, as shown in FIGS. 4 and 5. However, a connection mode such as that shown in FIG. 1 can be adopted, and a specific configuration of this mode is described below.

The main control device 1 is provided with a downstream transmitting means 8 for sending control data to the terminal devices 2, and a plurality of upstream receiving means 9 for independently receiving terminal data for the terminal devices 2. The terminal devices 2 are provided with upstream transmitting means 18 for sending terminal data to the main control device 1, and downstream receiving means 19 for receiving control data from the main control device 1. The functions of the transmission means and receiving means are the same as those described in the first embodiment with reference to FIGS. 4 and 5, and a description thereof is omitted.

The communication lines 3 may comprise downstream communication lines for sending the shared control data from the downstream transmitting means 8 to each of the downstream receiving means 19, and upstream communication lines for individually sending the terminal data from each of the upstream transmitting means 18 to each of the corresponding upstream receiving means 9, as shown in FIG. 1. Specifically, downstream communication lines are disposed so that shared control data is sent from the downstream transmitting means 8 to the each of the downstream receiving means 19 of the terminal devices 20 to 23. The upstream communication lines are configured so that individual pieces of terminal data are sent to the upstream receiving means 90, 91, 92, and 93 (see FIG. 4) corresponding to the upstream transmitting means 18 of the terminal devices 20, 21, 22, and 23, respectively.

As described above, the present invention provides a terminal control system comprising a main control device, a plurality of terminal devices controlled by the main control device, and communication lines for connecting the main control device and each of the terminal devices so as to allow bidirectional communication, wherein the configuration is simple, communication time is short, and highly reliable bidirectional communication is possible.

INDUSTRIAL APPLICABILITY

The terminal control system according to the present invention can be applied to sensor control systems comprising sensors (corresponding to terminal devices) and a microcomputer (corresponding to a main control device); actuator control systems comprising slave microcomputers (corresponding to terminal devices) for driving motors and other actuators, and a microcomputer (corresponding to a main control device) for comprehensively controlling the operation of the actuators; and other control systems.

Examples of sensor control systems include load sensor systems comprising load sensors disposed underneath a seat, and a microcomputer for controlling the load sensors to obtain detection results and computing the total load on the seat; and rotation sensor systems for detecting the rotation of the wheels of a vehicle. An example of an actuator control system is a seat orientation control system for a vehicle.

KEY

1 Main control device
2 Terminal device
3 Communication line

The invention claimed is:

1. A terminal control system comprising:
a main control device;
a plurality of terminal devices controlled by the main control device; and
communication lines for connecting the main control device and each of the terminal devices so as to allow bidirectional communication, wherein control data is simultaneously and collectively sent from the main control device to the terminal devices;
terminal data for each of the terminal devices is independently sent from each of the terminal devices to the main control device;
the main control device has downstream transmission means for sending the control data to the terminal devices, and a plurality of upstream receiving means for independently receiving the terminal data from the terminal devices;
the terminal devices have upstream transmission means for sending the terminal data from the terminal devices to the main control device, and downstream receiving means for receiving the control data from the main control device; and the communication lines have downstream communication lines for sending shared control data from the downstream transmission means to the downstream receiving means, and upstream communication lines for sending individual terminal data from the upstream transmission means to the corresponding upstream receiving means.

2. The terminal control system according to claim 1, wherein,
the control data has identification information for specifying each of the terminal devices;
the terminal devices have determination means for identifying whether identification information specifies any of the terminal devices; and
the main control device is configured to be capable of individually controlling the terminal devices.

3. The terminal control system according to claim 2, wherein
the identification information has a terminal identification number for specifying at least each of the terminal devices, and a flag for indicating whether the terminal identification number is valid or invalid; and
the determination means identifies whether the terminal identification number specifies any of the terminal devices when the flag indicates a valid state.

4. A terminal control system comprising:
a main control device;
a plurality of terminal devices controlled by the main control device; and
communication lines for connecting the main control device and each of the terminal devices so as to allow bidirectional communication, wherein
control data is simultaneously and collectively sent from the main control device to the terminal devices;
terminal data for each of the terminal devices is independently sent from each of the terminal devices to the main control device;
the main control device has downstream transmission means for sending the control data to the terminal devices, and a plurality of upstream receiving means for independently receiving the terminal data from the terminal devices;
the terminal devices have upstream transmission means for sending the terminal data from the terminal devices to the main control device, and downstream receiving means for receiving the control data from the main control device;
the main control device has interference prevention means for prevent interference of the terminal data sent from the terminal devices to the main control device;
the main control device and terminal devices have an arbiter unit for preventing the data sent by the devices from being received by the devices of the transmission source; and
the communication lines are bidirectional communication lines for transmitting the control data from the main control device to the terminal devices and for transmitting the terminal data from the terminal devices to the main control device, and are independently provided for each of the terminal devices.

5. The terminal control system according to claim 4, wherein
the control data has identification information for specifying each of the terminal devices;
the terminal devices have determination means for identifying whether identification information specifies any of the terminal devices; and
the main control device is configured to be capable of individually controlling the terminal devices.

6. The terminal control system according to claim 5, wherein
the identification information has a terminal identification number for specifying at least each of the terminal devices, and a flag for indicating whether the terminal identification number is valid or invalid; and
the determination means identifies whether the terminal identification number specifies any of the terminal devices when the flag indicates a valid state.

7. The terminal control system according to claim 4, wherein the interference prevention means has diodes that form forward connections from the input end of the upstream receiving means to the output end of the downstream transmission means.

8. The terminal control system according to claim 4, wherein
the output end of the downstream transmission means and the output end of the upstream transmission means can assume two states, i.e., a state in which each transmission means outputs one of two Boolean values that can be independently output, and another state, which is a high impedance state; and
the arbiter unit controls switching between at least these two states.

* * * * *